United States Patent
Suesada et al.

(10) Patent No.: US 10,625,587 B2
(45) Date of Patent: Apr. 21, 2020

(54) VEHICLE DOOR SASH STRUCTURE

(71) Applicants: HONDA MOTOR CO., LTD., Tokyo (JP); Nishikawa Rubber Co., Ltd., Hiroshima (JP)

(72) Inventors: Ryo Suesada, Wako (JP); Masatoshi Mori, Wako (JP); Toshifumi Matsuura, Hiroshima (JP); Takao Toyoshima, Hiroshima (JP)

(73) Assignees: HONDA MOTOR CO., LTD., Tokyo (JP); NISHIKAWA RUBBER CO., LTD., Hiroshima-shi (JP)

( * ) Notice: Subject to any disclaimer, the term of this patent is extended or adjusted under 35 U.S.C. 154(b) by 0 days.

(21) Appl. No.: 16/383,378

(22) Filed: Apr. 12, 2019

(65) Prior Publication Data

US 2019/0315215 A1 Oct. 17, 2019

(30) Foreign Application Priority Data

Apr. 13, 2018 (JP) .................................. 2018-077417

(51) Int. Cl.
*B60J 10/76* (2016.01)
*B60J 10/27* (2016.01)
*B60J 10/265* (2016.01)
*B60R 13/04* (2006.01)

(52) U.S. Cl.
CPC ............ *B60J 10/76* (2016.02); *B60J 10/265* (2016.02); *B60J 10/27* (2016.02); *B60R 13/04* (2013.01)

(58) Field of Classification Search
CPC .................................. B60J 10/76; B60J 10/88
See application file for complete search history.

(56) References Cited

U.S. PATENT DOCUMENTS

| | | | | |
|---|---|---|---|---|
| 5,317,835 A * | 6/1994 | Dupuy | ................... | B60J 10/235 49/377 |
| 6,493,992 B2 * | 12/2002 | Goto | ........................ | B60J 10/79 49/441 |
| 8,302,350 B2 * | 11/2012 | Lee | ........................... | B60J 10/87 49/440 |
| 8,869,456 B2 * | 10/2014 | Matsuura | ................... | E06B 7/22 49/489.1 |
| 8,919,846 B2 * | 12/2014 | Maass | ..................... | B60J 5/0402 296/1.08 |
| 9,096,114 B2 * | 8/2015 | Baratin | ................... | B60J 10/235 |
| 9,963,088 B2 * | 5/2018 | Yoshida | .................... | B60J 10/30 |
| 9,969,250 B2 * | 5/2018 | Takeda | ...................... | B60J 10/27 |
| 10,150,356 B2 * | 12/2018 | Takahashi | ................ | B60J 10/76 |

(Continued)

FOREIGN PATENT DOCUMENTS

JP 3869260 B2 1/2007

*Primary Examiner* — Catherine A Kelly
(74) *Attorney, Agent, or Firm* — Rankin, Hill & Clark LLP

(57) ABSTRACT

A vehicle door sash structure includes a holding unit. The holding unit includes a guide locking portion arranged in a region of a run channel opposed in a vehicle inner-outer direction to a tip end rim of an inner beam portion in a state of temporary attachment after completion of attachment of a molding to an outer beam portion. The guide locking portion is inclined in a direction to guide the run channel to a position of completion of attachment while coming into contact with the tip end rim of the inner beam portion by an input of an attachment force in a direction to attach the molding to the run channel in the state of temporary attachment.

6 Claims, 7 Drawing Sheets

(56) References Cited

U.S. PATENT DOCUMENTS

| | | | | |
|---|---|---|---|---|
| 10,220,692 B2* | 3/2019 | Mori | ................ | B60J 10/20 |
| 2006/0021281 A1* | 2/2006 | Tamaoki | ................ | B60J 10/265 |
| | | | | 49/441 |
| 2013/0219799 A1* | 8/2013 | Takeuchi | ................ | B60J 10/88 |
| | | | | 49/472 |
| 2015/0273990 A1* | 10/2015 | Adachi | ................ | B60J 1/17 |
| | | | | 49/459 |
| 2016/0059684 A1* | 3/2016 | Nam | ................ | B60J 10/088 |
| | | | | 49/483.1 |
| 2019/0193542 A1* | 6/2019 | Prodoni | ................ | B60J 10/265 |
| 2019/0256154 A1* | 8/2019 | Kamimura | ................ | B60R 13/04 |

* cited by examiner

US 10,625,587 B2

VEHICLE DOOR SASH STRUCTURE

BACKGROUND OF THE INVENTION

1. Field of the Invention

The present invention relates to a vehicle door sash structure provided with a run channel to seal between a door sash and a window glass.

2. Description of the Related Art

It has been a common practice to provide a door sash with a run channel in order to seal a gap between the sash and a window glass.

For example, according to Japanese Patent No. 3869260 (Patent Document 1), an outer wall part of a rail portion, which has a substantially U-shaped cross-section and surrounds a rim of a window glass when the window glass is pulled up, is formed from an attachable molding separately from a window frame. Moreover, a run channel is arranged in the rail portion having the substantially U-shaped cross-section which is formed by attaching the molding to the window frame.

SUMMARY OF THE INVENTION

In the sash structure according to Patent Document 1, the molding and the run channel are formed as separate components. This configuration therefore has a problem of complicated attachment work that requires a large number of man-hours.

The present invention has been made in view of the aforementioned problem. An object of the present invention is to provide a vehicle door sash structure that enables attachment of a molding and a run channel to a window frame with simple work and less man-hours for the work.

To attain the object, the present invention provides a vehicle door sash structure having a window glass arranged in a window frame, a rail portion constituting the window frame and surrounding a rim of the window glass, a molding constituting an outer wall of the rail portion, a window frame body constituting an inner wall of the rail portion, and a run channel arranged in the rail portion. The vehicle door sash structure includes a molding assembly which is provided with the molding and the run channel integrated together and is attached to the window frame body from a vehicle outer side to a vehicle inner side in a vehicle inner-outer direction along a direction from an inner side to an outer side of a vehicle.

According to the above-described configuration, it is possible to attach the molding and the run channel by a single process of attaching the molding assembly to the window frame body from the vehicle outer side to the vehicle inner side in the vehicle inner-outer direction along the direction from the inner side to the outer side of the vehicle. In this way, the molding and the run channel can be attached to the window frame with simple work and less man-hours for the work.

According to the present invention, it is possible to provide a vehicle door sash structure that enables attachment of a molding and a run channel to a window frame with simple work and less man-hours for the work.

DETAILED DESCRIPTION OF THE EMBODIMENTS

Embodiments of the present invention will be hereinafter described in detail with reference to the accompanying drawings. In the following description, the same constituents are denoted by the same reference signs and overlapping explanations thereof will be omitted.

First of all, a description will be given of a vehicle S that installs a vehicle door sash structure 1 of an embodiment of the present invention.

Figure 1:
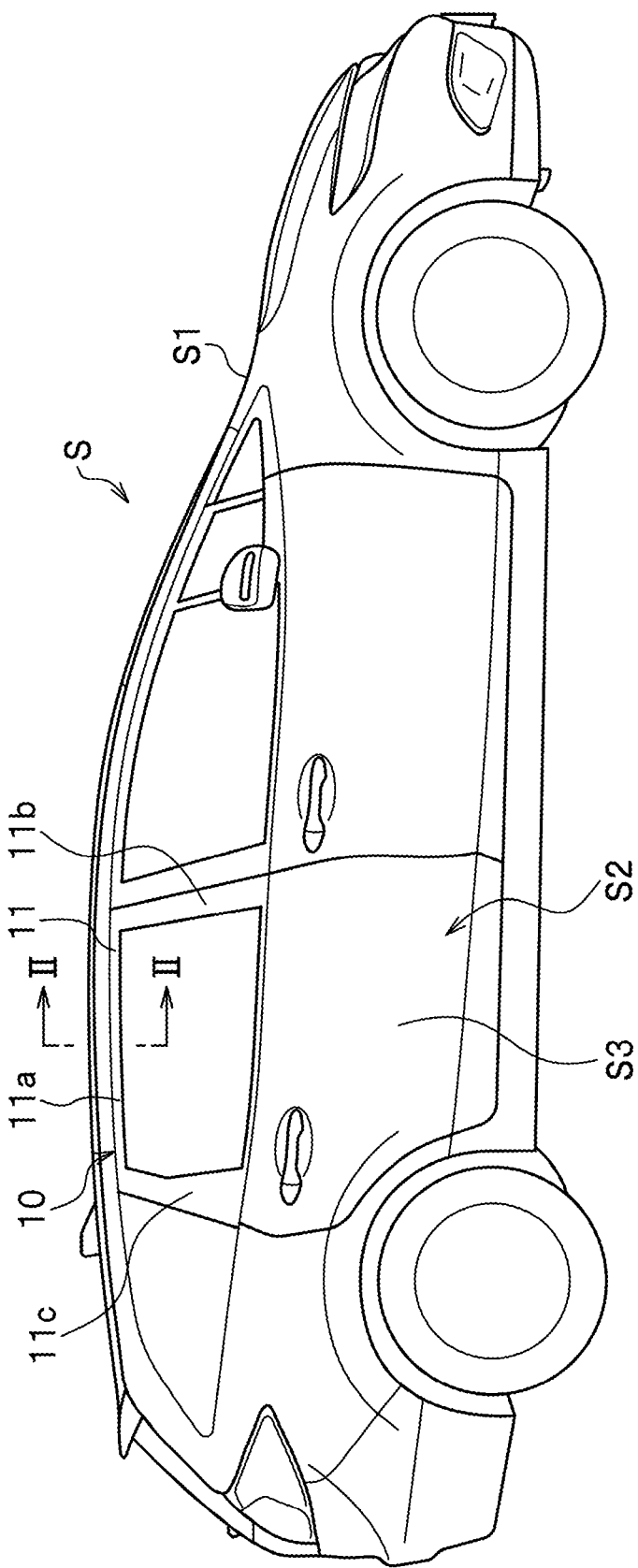
FIG. 1 is a side view showing a vehicle body to install a sash structure according to an embodiment of the present invention.

As shown in FIG. 1, a rear seat opening to allow a passenger to get in and out of the vehicle S is opened at a rear part on each side surface of a vehicle body S1 of the vehicle S. Moreover, a rear seat door S2 is installed at the rear seat opening to make the rear seat opening openable and closable.

An upper half of the rear seat door S2 is set to a door window 10 and a lower half thereof is set to a door body S3.

The door window 10 includes a window frame 11 and a window glass 12 that is arranged in such a way as to be capable of going up and down in the window frame 11.

The vehicle door sash structure 1 of this embodiment is a structure that guides the window glass 12 that goes up and down while constituting the window frame 11 of the door window 10.

Note that the vehicle door sash structure 1 of this embodiment describes an upper side portion 11a of the window frame 11 at the rear seat door S2.

Figure 2:
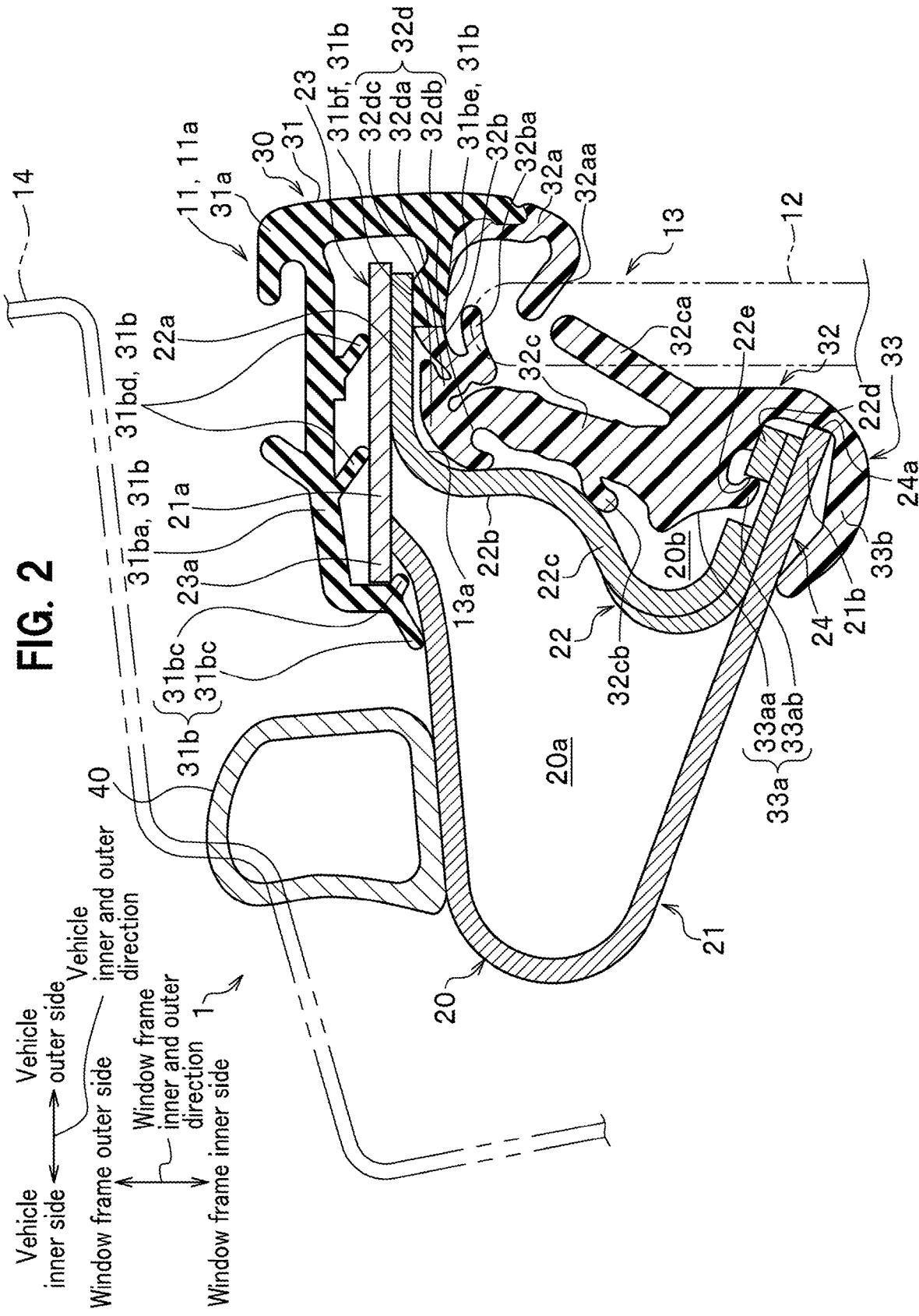
FIG. 2 is a cross-sectional view showing the sash structure according to the embodiment (in a state after completion of attachment of a molding assembly), which is taken along the II-II line in FIG. 1.

As shown in FIG. 2, the window frame 11 includes a window frame body 20, a molding assembly 30, and a door seal 40. Moreover, the window frame body 20 and the molding assembly 30 provide the window frame 11 with a rail portion 13.

The rail portion 13 is formed to have a substantially U-shaped cross-section that is opened toward a frame inner side in terms of a frame inner-outer direction. The rail portion 13 surrounds a rim of the window glass 12 and guides the window glass 12 that goes up and down.

Here, the frame inner-outer direction is a direction in line with a direction from inside to outside of the window frame 11. For example, in terms of the upper side portion 11a of the window frame illustrated in this embodiment, the frame inner-outer direction corresponds to an up-down direction of the vehicle. Meanwhile, in terms of a front side portion 11b and a rear side portion 11c of the window frame 11, the frame inner-outer direction corresponds to a front-rear direction of the vehicle.

The window frame body 20 includes a sash inner portion 21 and a sash outer portion 22.

The sash inner portion 21 is formed from a plate member which is curved into a substantially V-shaped cross-section by bending work, and a V-groove 20a formed inside is arranged to be opened to a vehicle outer side in terms of a vehicle inner-outer direction.

Here, the vehicle inner-outer direction is a direction in line with a direction from a vehicle inside to a vehicle outside of the vehicle S. For example, in terms of the rear seat door S2 illustrated in this embodiment, the vehicle inner-outer direction corresponds to a width direction of the vehicle. In terms of a tail gate (not illustrated) used to open and close a rear part of the vehicle, the vehicle inner-outer direction corresponds to the front-rear direction of the vehicle. In terms of a sun roof (not illustrated) used to open and close a ceiling part, the vehicle inner-outer direction corresponds to the up-down direction of the vehicle.

Meanwhile, in the sash inner portion 21, an inner portion outside joining margin 21a is arranged at an opening rim on a frame outer side in the frame inner-outer direction at the V-shaped opening portion, and an opening rim on the frame inner side in the frame inner-outer direction at the V-shaped opening portion is set to an inner portion inside joining margin 21b.

The inner portion outside joining margin 21a is formed from a flat-plate member, which is installed at the opening rim on the frame outer side in the frame inner-outer direction of the sash inner portion 21 by means of joining such as spot welding.

The sash outer portion 22 includes an outer portion outside joining margin 22a, a rail inner wall portion 22b, a housing wall portion 22c, and an outer portion inside joining margin 22d, and is formed to have a substantially W-shaped cross-section by bending a single flat-plate member in such a way as to define the aforementioned four regions.

The outer portion outside joining margin 22a has a flat-plate shape and is arranged horizontally along the vehicle inner-outer direction, thus constituting an outer beam portion 23 to be described later.

The rail inner wall portion 22b has a flat-plate shape and extends from an end rim on a vehicle inner side in the vehicle inner-outer direction of the outer portion outside joining margin 22a along a plate surface of the window glass 12, thus constituting an inner wall part of the rail portion 13. In other words, the window frame body 20 constitutes an inner wall of the rail portion 13.

The housing wall portion 22c has a flat-plate shape and extends obliquely from a lower rim of the rail inner wall portion 22b to the vehicle inner side in the vehicle inner-outer direction.

The outer portion inside joining margin 22d has a flat-plate shape and extends from an end rim on the frame inner side in the frame inner-outer direction to the vehicle outer side in the vehicle inner-outer direction of the housing wall portion 22c, thus constituting an inner beam portion 24 to be described later.

Meanwhile, the outer portion inside joining margin 22d and the housing wall portion 22c collectively constitute a housing recess 20b having a substantially V-shaped cross-section.

A guide locking portion 33a to be described later is housed in the housing recess 20b while attaching the molding assembly 30 to the window frame body 20.

Moreover, an engaging portion 22e is provided to the outer portion inside joining margin 22d.

The engaging portion 22e is formed from a hole rim that forms a rectangular hole which is opened in the outer portion inside joining margin 22d.

Meanwhile, the sash outer portion 22 is located inside the V-groove 20a in such a way as to close the V-shaped opening portion of the sash inner portion 21. Moreover, the outer portion outside joining margin 22a is joined to the inner portion outside joining margin 21a by means of joining such as spot welding, and a region thus joined is set to the outer beam portion 23.

Furthermore, the outer portion inside joining margin 22d is joined to the inner portion inside joining margin 21b by means of joining such as spot welding, and a region thus joined is set to the inner beam portion 24.

In addition, regarding the outer beam portion 23 and the inner beam portion 24, the outer beam portion 23 is erected on the window frame body 20 from the vehicle inner side to the vehicle outer side in the vehicle inner-outer direction, and the inner beam portion 24 is erected on the window frame body 20 from the vehicle inner side to the vehicle outer side in the vehicle inner-outer direction as with the outer beam portion 23. Moreover, an interval in a direction toward end rims between the outer beam portion 23 and the inner beam portion 24 slightly spreads outward in the frame inner-outer direction. For example, an angle formed between the outer beam portion 23 and the inner beam portion 24 is set to about 20 degrees in this embodiment.

As described above, the window frame body 20 is formed into a substantially A-shaped cross-section by the sash outer portion 22 and the sash inner portion 21.

The outer beam portion 23 takes on a form of a cantilever erected on the window frame body 20 so as to be capable of attaching a molding 31 to be described later, thus constituting a bottom part of the rail portion 13.

Meanwhile, regarding the outer beam portion 23, an end portion of the inner portion outside joining margin 21a located on the vehicle inner side in the vehicle inner-outer direction is set to an outer beam engaging projection 23a. In other words, the outer beam engaging projection 23a projects to the vehicle inner side in the vehicle inner-outer direction.

The inner beam portion 24 takes on a form of a cantilever erected on the window frame body 20 as with the outer beam portion 23.

In the meantime, on the inner beam portion 24, the sash outer portion 22 and the sash inner portion 21 overlap and are joined to each other such that an end rim of the inner portion inside joining margin 21b slightly protrudes to the vehicle outer side in the vehicle inner-outer direction from an end rim of the outer portion inside joining margin 22d. In other words, an end rim of the inner beam portion 24 takes on a stepped shape in line with an inclination of the guide locking portion 33a to be described later.

The molding assembly 30 includes the molding 31 and a run channel 32. The molding assembly 30 is attached to the window frame body 20 from the vehicle outer side to the vehicle inner side along the vehicle inner-outer direction.

The molding 31 is made of a flexible resin material, and includes a molding body 31a and a molding attachment module 31b.

In the meantime, the molding 31 is attached to a tip end portion of the outer beam portion 23 through the molding attachment module 31b.

The molding body 31a constitutes an outer wall part of the rail portion 13. Meanwhile, an outer surface in the vehicle inner-outer direction of the molding body 31a constitutes the window frame 11 and a design portion of the vehicle S.

The molding attachment module 31b is provided on an inner surface in the vehicle inner-outer direction of the molding body 31a, and includes a molding elastic beam 31ba, a molding locking claw 31bb, a locking claw elastic contact spring 31bc, elastic contact springs 31bd, a molding supporting beam 31be, and a curved supporting portion 31bf.

The molding elastic beam 31ba and the molding supporting beam 31be are erected parallel to each other on a surface on the vehicle inner side in the vehicle inner-outer direction of the molding body 31a toward the vehicle inner side in the vehicle inner-outer direction.

An interval between the molding elastic beam 31ba and the molding supporting beam 31be is set to such a dimension that enables insertion and fitting of the outer beam portion 23.

The molding elastic beam 31ba includes the molding locking claw 31bb and the locking claw elastic contact spring 31bc at its tip end, and the paired elastic contact springs 31bd on its surface on the frame inner side (a surface opposed to the molding supporting beam 31be) in the frame inner-outer direction.

The molding locking claw 31bb has a claw shape which is bent toward the vehicle outer side in the vehicle inner-outer direction and toward the frame outer side in the frame inner-outer direction (in a direction to allow the molding 31 to fall off the outer beam portion 23) so as to be engageable with the outer beam engaging projection 23a.

The locking claw elastic contact spring 31bc has flexibility and takes on a form of a cantilever erected toward the frame inner side in the frame inner-outer direction and the vehicle inner side in the vehicle inner-outer direction. Moreover, the locking claw elastic contact spring 31bc is arranged in the vicinity of the molding locking claw 31bb at a tip end portion of the molding elastic beam 31ba.

The elastic contact springs 31bd has flexibility and takes on a form of a cantilever erected toward the frame inner side in the frame inner-outer direction and the vehicle outer side in the vehicle inner-outer direction.

In the molding supporting beam 31be, a surface on the frame outer side in the frame inner-outer direction (a surface opposed to the molding elastic beam 31ba) includes the curved supporting portion 31bf formed from a curved surface that is curved in such a way as to project toward the frame outer side in the frame inner-outer direction.

According to the above-described configuration of the molding attachment module 31b, tip ends of the pair of elastic contact springs 31bd come into contact with a surface on the frame outer side in the frame inner-outer direction of the outer beam portion 23 and are bent in the state of attaching the molding 31 to the outer beam portion 23. Then, the molding 31 is biased to the frame outer side in the frame inner-outer direction by a bending reaction force (resilience) of the elastic contact springs 31bd, whereby the curved supporting portion 31bf comes into contact with a surface on the frame inner side in the frame inner-outer direction of the outer beam portion 23 and the molding locking claw 31bb is engaged with the vehicle outer side in the vehicle inner-outer direction of the outer beam engaging projection 23a.

Meanwhile, a tip end of the locking claw elastic contact spring 31bc comes into contact with a surface on the frame outer side in the frame inner-outer direction of the sash inner portion 21 and is bent in the state of attaching the molding 31 to the outer beam portion 23. Then, the molding 31 is biased to the frame outer side in the frame inner-outer direction by a bending reaction force (resilience) of the locking claw elastic contact spring 31bc, whereby the molding locking claw 31bb is also engaged with the frame outer side in the frame inner-outer direction of the outer beam engaging projection 23a.

Here, a position to locate the locking claw elastic contact spring 31bc is set such that the bending reaction force of the locking claw elastic contact spring 31bc reacts more strongly on the molding locking claw 31bb and the molding locking claw 31bb is engaged more strongly with the outer beam engaging projection 23a.

The molding locking claw 31bb and the molding 31 are biased and held to the frame outer side in the frame inner-outer direction by the bending reaction forces (resilience) of the locking claw elastic contact spring 31bc and the elastic contact springs 31bd described above.

In this way, the molding 31 is attached to the outer beam portion 23 while eliminating backlash in the frame inner-outer direction. Moreover, the molding locking claw 31bb is kept from falling off the outer beam engaging projection 23a due to shakes when opening and closing the door or by unexpected vibrations and the like.

The run channel 32 is made of an elastic material such as rubber that has flexibility and elasticity. The run channel 32 is formed integrally with the molding 31 by means of joining at the time of vulcanization and the like. In other words, the molding 31 and the run channel 32 are formed from a single component.

Meanwhile, the run channel 32 is housed in the rail portion 13 in the state where the run channel 32 is attached to the window frame 11.

In addition, the run channel 32 includes an outer wall portion 32a, a bottom portion 32b, and an inner wall portion 32c. In the run channel 32, the bottom portion 32b and the inner wall portion 32c are arranged substantially straight, and are bent and housed in the rail portion 13.

The outer wall portion 32a is arranged in the frame inner-outer direction and integrally with the surface on the vehicle inner side in the vehicle inner-outer direction of the molding body 31a. Moreover, the outer wall portion 32a and the molding body 31a collectively constitute the outer wall part of the rail portion 13 in the state of attaching the run channel 32 to the window frame 11. In the meantime, the outer wall portion 32a includes an outer wall elastic piece 32aa on its surface in the vehicle inner side in the vehicle inner-outer direction.

The outer wall elastic piece 32aa is provided at an end rim on the frame inner side in the frame inner-outer direction on a surface on the vehicle inner side in such a way as to extend to the vehicle inner side in the vehicle inner-outer direction and to the frame outer side in the frame inner-outer direction. Moreover, the outer wall elastic piece 32aa comes into elastic contact with a surface on the vehicle outer side in the vehicle inner-outer direction of the window glass 12 that goes up and down, thus suppressing backlash of the window glass 12.

The bottom portion 32b is arranged integrally with the molding supporting beam 31be and along the vehicle inner-outer direction. Moreover, the bottom portion 32b and the outer beam portion 23 collectively constitute the bottom part of the rail portion 13 in the state of attaching the run channel 32 to the window frame 11. In the meantime, the bottom portion 32b includes a bottom elastic piece 32ba on its surface in the frame inner side in the frame inner-outer direction.

The bottom elastic piece 32ba is provided at an end rim on the vehicle inner side in the vehicle inner-outer direction on a surface on the frame inner side in such a way as to extend to the vehicle outer side in the vehicle inner-outer direction and to the frame inner side in the frame inner-outer direction. Moreover, the bottom elastic piece 32ba comes into elastic contact with an end surface of the window glass 12 that goes up and down, thus supporting the window glass 12.

The inner wall portion 32c extends from an end rim on the vehicle inner side in the vehicle inner-outer direction of the bottom portion 32b. Moreover, the inner wall portion 32c and the rail inner wall portion 22b of the sash outer portion 22 collectively constitute the inner wall part of the rail portion 13 in the state of attaching the run channel 32 to the window frame 11. In the meantime, a restorative biasing portion 32d is provided at a seam part between the inner wall portion 32c and the bottom portion 32b.

The restorative biasing portion 32d is formed to be easily bendable when housing the run channel 32 into the rail portion 13. Meanwhile, the restorative biasing portion 32d includes a bottom side bending part 32da, an inner wall side bending part 32db, and a corner part elastic body 32dc, thus taking on a substantially π-shape.

The bottom side bending part 32da has a flat-plate shape and joins the bottom portion 32b to the corner part elastic body 32dc. Hence, the molding 31 swings in the frame inner-outer direction (the up-down direction in FIG. 2) about the bottom side bending part 32da.

The inner wall side bending part 32db has a flat-plate shape and joins the inner wall portion 32c to the corner part elastic body 32dc. Hence, the inner wall portion 32c of the run channel 32 swings in the vehicle inner-outer direction (the right-left direction in FIG. 2) about the inner wall side bending part 32db.

Each of the bottom side bending part 32da and the inner wall side bending part 32db is formed thinner than the remaining regions of the run channel 32 so as to achieve flexural deformation and transmission of the resilience to the bottom portion 32b and to the inner wall portion 32c.

The corner part elastic body 32dc is housed in a rail corner part 13a of the rail portion 13 located between the bottom part and the inner wall part thereof while being elastically deformed in conformity to the shape of the rail corner part 13a. In the meantime, the corner part elastic body 32dc is formed thicker than the bottom side bending part 32da and the inner wall side bending part 32db.

Moreover, when attaching the run channel 32, the bottom side bending part 32da and the inner wall side bending part 32db are bent while the corner part elastic body 32dc is elastically deformed. Thus, the run channel 32 is installed along an inner surface of the rail portion 13.

By configuring the restorative biasing portion 32d as described above, it is possible to reduce an adverse effect on the inner wall portion 32c side when the molding 31 swings up and down. Thus, the engagement between a locking projection 33ab and the engaging portion 22e is stabilized. Meanwhile, it is possible to reduce an adverse effect on the inner wall portion 32c side when the inner wall portion 32c swings right and left. Thus, the engagement between the molding locking claw 31bb and the outer beam engaging projection 23a is stabilized.

In the meantime, the inner wall portion 32c includes an inner wall elastic piece 32ca on a surface on the vehicle outer side in the vehicle inner-outer direction.

The inner wall elastic piece 32ca is provided at an end rim on the frame inner side in the frame inner-outer direction on a surface on the vehicle outer side in the vehicle inner-outer direction, and extends to the vehicle outer side in the vehicle inner-outer direction and to the frame outer side in the frame inner-outer direction. Moreover, the inner wall elastic piece 32ca comes into elastic contact with a surface on the vehicle inner side in the vehicle inner-outer direction of the window glass 12 that goes up and down, thus suppressing the backlash of the window glass 12. In the meantime, the inner wall portion 32c includes a holding unit 33 provided on a back side (on a surface on the vehicle inner side in the vehicle inner-outer direction) of the inner wall elastic piece 32ca.

The holding unit 33 is configured to be lockable with the inner beam portion 24, and includes the guide locking portion 33a, a locking lip 33b, and an inner wall side elastic contact spring 32cb.

The guide locking portion 33a is arranged at a region of the run channel 32 opposed in the vehicle inner-outer direction to a tip end rim 24a of the inner beam portion 24 in a state of temporary attachment (see FIG. 5) after completion of attachment of the molding 31 to the outer beam portion 23. Then, the guide locking portion 33a is housed in the housing recess 20b in a state of completion of attachment (see FIG. 2). In the meantime, the guide locking portion 33a includes a guide surface 33aa and the locking projection 33ab.

The guide surface 33aa is set to a position to come into contact with a tip end rim of the inner beam portion 24 by an input of an attachment force to the run channel 32 in a direction to attach the molding 31 (the vehicle inner-outer direction) in the state of temporary attachment (see FIG. 5) after completion of attachment of the molding 31 to the outer beam portion 23.

Figure 6:
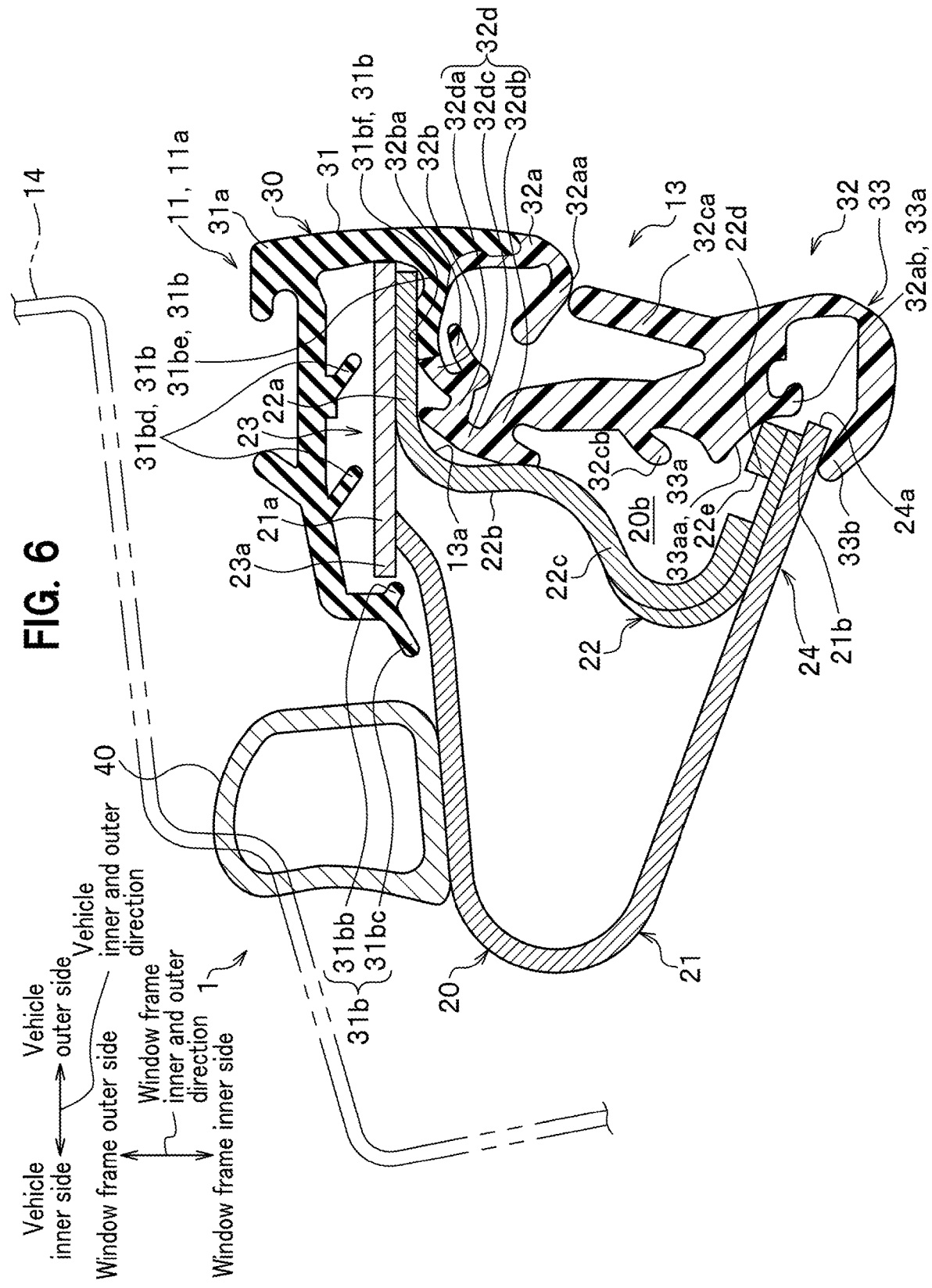
FIG. 6 is a cross-sectional view showing a state where a guide surface comes into contact with an end rim of an inner beam portion, which is taken along the II-II line in FIG. 1.

Meanwhile, the guide surface 33aa is formed from an inclined surface which is inclined in a direction to guide the run channel 32 to a position of completion of attachment while being in contact with the tip end rim of the inner beam portion 24, by the input of the attachment force (see FIG. 6). In other words, the guide surface 33aa is formed from an inclined surface that faces the vehicle inner side in the vehicle inner-outer direction and faces the frame inner side in the frame inner-outer direction in the state of contact with the tip end rim of the inner beam portion 24 by the input of the attachment force.

The locking projection 33ab is provided as a projection having a wedge-shaped cross-section to be formed at a region of an end rim (an outer rim) on the vehicle outer side in the vehicle inner-outer direction of the guide surface 33aa. Moreover, a tip end portion of the wedge shape of the locking projection 33ab is made engageable with the engaging portion 22e that faces the frame outer side in the frame inner-outer direction.

Here, in the state of completion of attachment, resilience to restore the original straight shape acts on the bent run channel 32 (see FIG. 2). Since the guide locking portion 33a is inclined in the direction to guide the run channel 32 to the position of completion of attachment, the locking projection 33ab is biased in a direction to dig into a plate surface of the inner beam portion 24 by the resilience of the run channel 32. Due to this action, the locking projection 33ab is locked more strongly with the engaging portion 22e provided on the inner beam portion 24, and the state of attachment is thus stabilized.

The locking lip 33b has flexibility and is formed into a substantially claw-like shape that is curved from a base portion of the inner wall elastic piece 32ca to the vehicle inner side in the vehicle inner-outer direction. Meanwhile, the shape and dimensions of the locking lip 33b are set such that a tip end portion of the locking lip 33b overlaps the tip end portion of the locking projection 33*ab* without interfering between the tip end rim 24*a* of the inner beam portion 24 and the guide locking portion 33*a* in the state of temporary attachment after completion of attachment of the molding 31 to the outer beam portion 23 (see FIG. 5). In other words, the locking lip 33*b* is set such a way as to avoid the interference between the tip end rim 24*a* of the inner beam portion 24 and the guide locking portion 33*a* while partially overlapping the guide locking portion 33*a* in the vehicle inner-outer direction.

Figure 7:
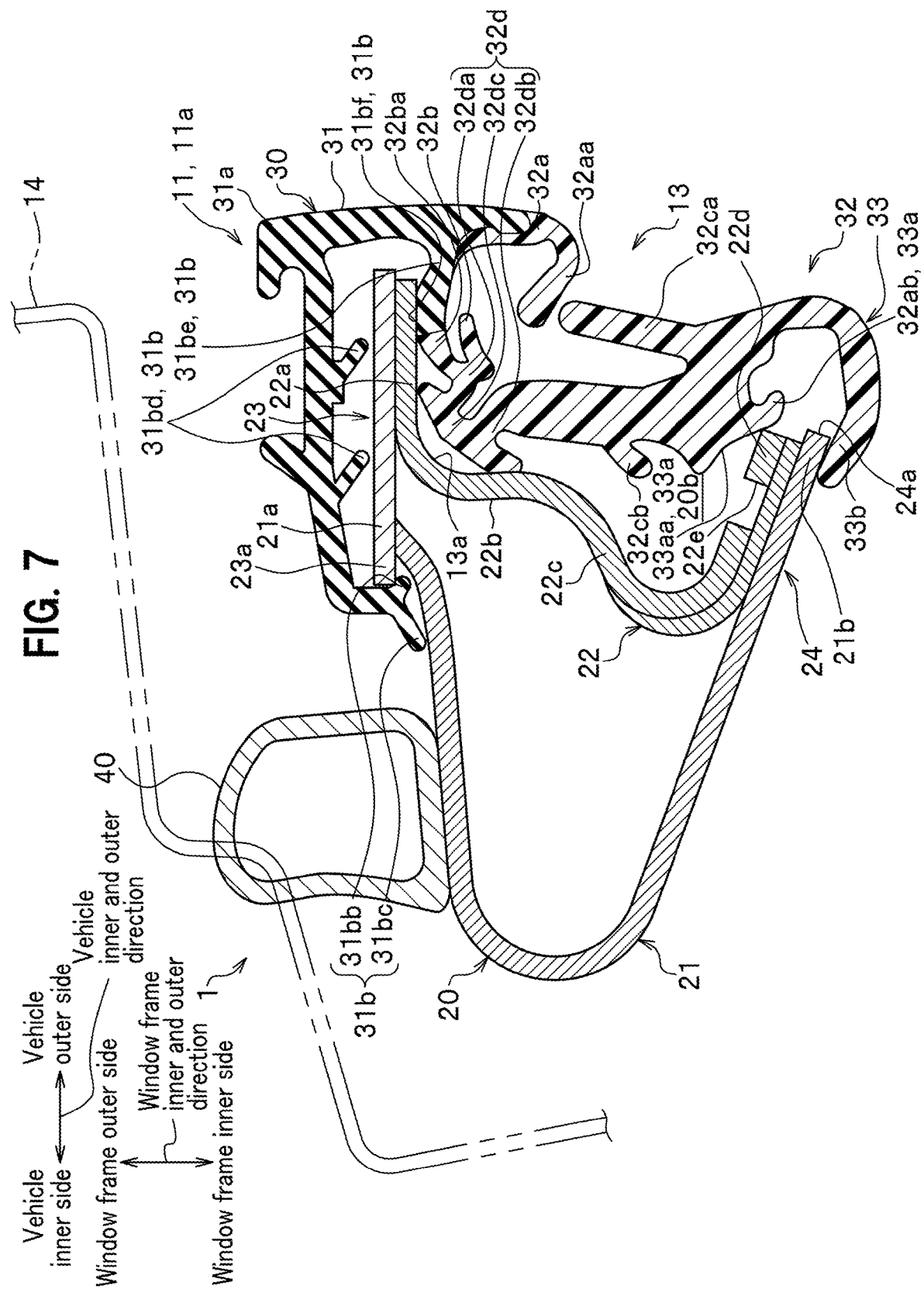
FIG. 7 is a cross-sectional view showing a state where the guide surface slides and runs on the end rim of the inner beam, which is taken along the II-II line in FIG. 1.

Meanwhile, the locking lip 33*b* is subjected to flexural deformation while running on a surface on the frame inner side in the frame inner-outer direction of the inner beam portion 24 by the input of the attachment force in the direction to attach the molding 31 (the vehicle inner-outer direction) (see FIG. 7). Then, a tip end of the locking lip 33*b* is thrust on the surface (a rear surface) on the frame inner side of the inner beam portion 24 by the resilience attributed to the flexural deformation of the locking lip 33*b*, and the locking lip 33*b* is locked with the rear surface by a friction caused in this event. In other words, in the state of completion of attachment where attachment of the molding assembly 30 is completed, the locking lip 33*b* and the locking projection 33*ab* sandwich the inner beam portion 24 on the front and rear surfaces thereof.

The inner wall side elastic contact spring 32*cb* takes on a form of a cantilever having flexibility, and is erected on a region of the inner wall portion 32*c* facing the vehicle inner side toward the frame inner side in the frame inner-outer direction and toward the vehicle inner side in the vehicle inner-outer direction.

Meanwhile, the inner wall side elastic contact spring 32*cb* is arranged between the guide surface 33*aa* and the restorative biasing portion 32*d*. By arranging the inner wall side elastic contact spring 32*cb* in this region, the inner wall side elastic contact spring 32*cb* is located at a position not interfering between the tip end rim 24*a* of the inner beam portion 24 and the guide locking portion 33*a* in the state of temporary attachment after completion of attachment of the molding 31 to the outer beam portion 23. Accordingly, workability of assembly of the run channel 32 is not damaged by providing the inner wall side elastic contact spring 32*cb*.

In addition, when attaching the run channel 32, the inner wall side elastic contact spring 32*cb* is bent while coming into contact with a region from the rail inner wall portion 22*b* to the housing wall portion 22*c* of the sash outer portion 22. Then, a bending reaction force (resilience) of the inner wall side elastic contact spring 32*cb* is combined with resilience of the restorative biasing portion 32*d*, and the locking projection 33*ab* is engaged more strongly with the engaging portion 22*e*.

In this way, it is possible to engage the locking projection 33*ab* with the engaging portion 22*e* more firmly after completion of assembly of the run channel 32.

The door seal 40 is arranged in a region of the sash inner portion 21 of the window frame body 20 facing a vehicle body panel 14. In the meantime, the door seal 40 is formed into a hollow cylindrical member by extrusion, which has a substantially D-shaped cross-section and projects from the sash inner portion 21 to the vehicle body panel 14. Moreover, the door seal 40 is interposed between the sash inner portion 21 and the vehicle body panel 14 in a state of closing the rear seat door S2, thus sealing a space in between.

Next, procedures to attach the molding assembly 30 will be described.

Figure 3:
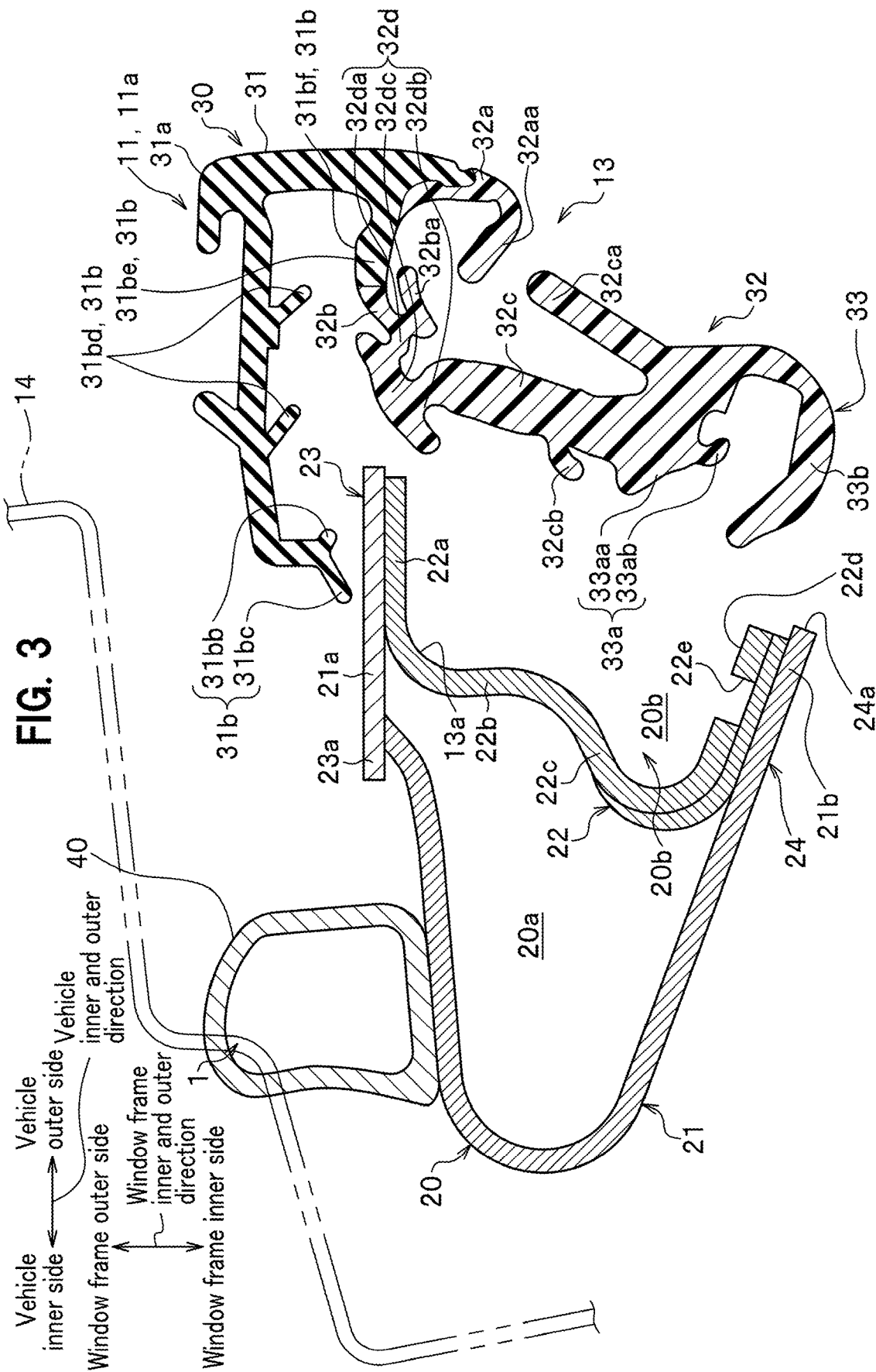
FIG. 3 is a cross-sectional view showing a state at a start of attachment to attach the molding assembly to a window frame body, which is taken along the II-II line in FIG. 1.

First, as shown in FIG. 3, the molding assembly 30 is located on the vehicle outer side in the vehicle inner-outer direction of the window frame body 20. Next, the molding body 31*a* is thrust from the vehicle outer side to the vehicle inner side in the vehicle inner-outer direction while putting the outer beam portion 23 into a space between the molding elastic beam 31*ba* and the molding supporting beam 31*be*.

Figure 4:
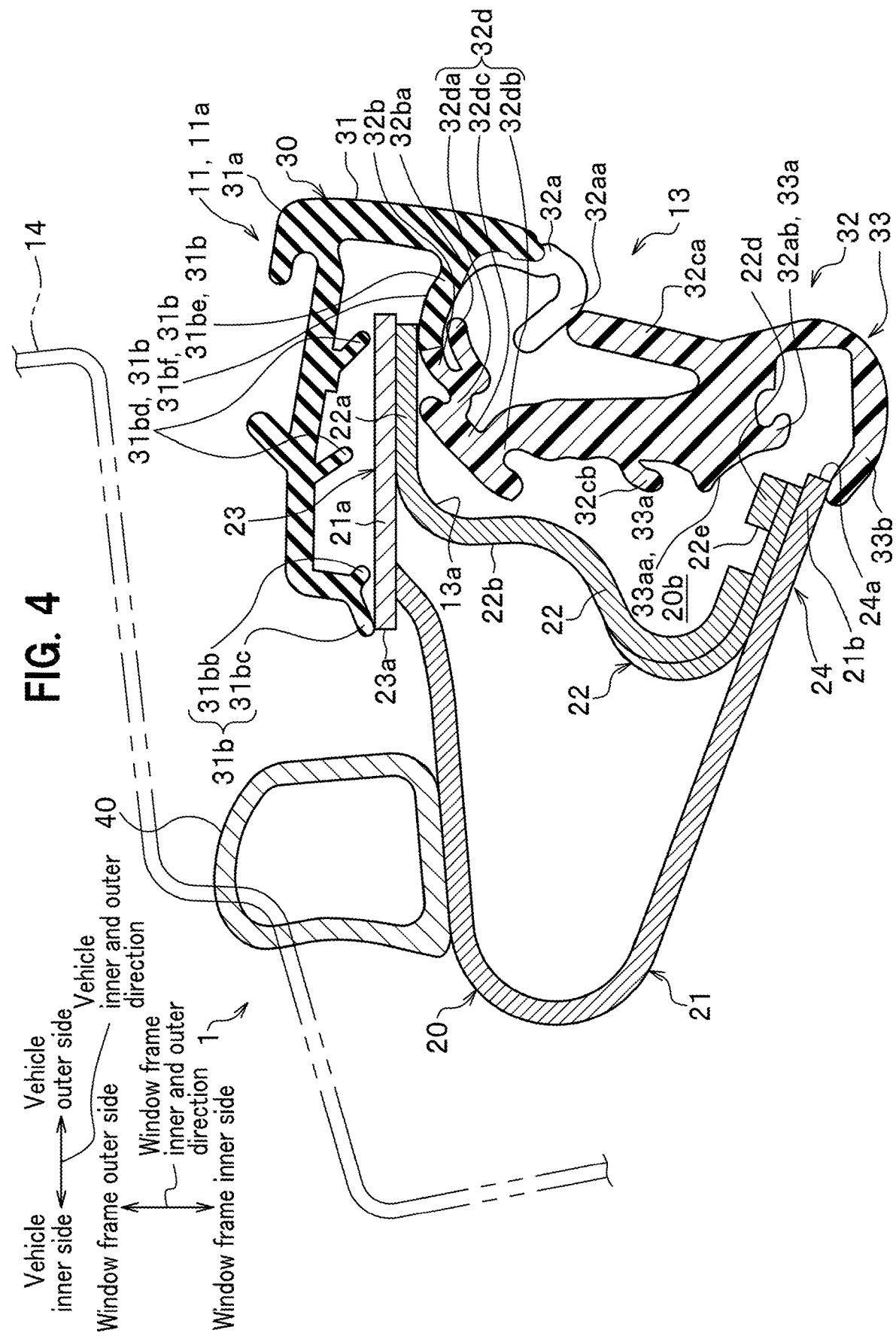
FIG. 4 is a cross-sectional view showing a state of attaching a molding in the molding assembly to an outer beam portion, which is taken along the II-II line in FIG. 1.

Here, when the upper side portion 11*a* of the molding 31 is formed separately from the front side portion and the rear side portion thereof, it is possible to tilt and thrust the molding 31 as shown in FIG. 4.

On the other hand, it is not possible to tilt the molding 31 when the front side portion 11*b*, the upper side portion 11*a*, and the rear side portion 11*c* are integrated together. In this case, the molding 31 is thrust while bending the molding elastic beam 31*ba*.

Figure 5:
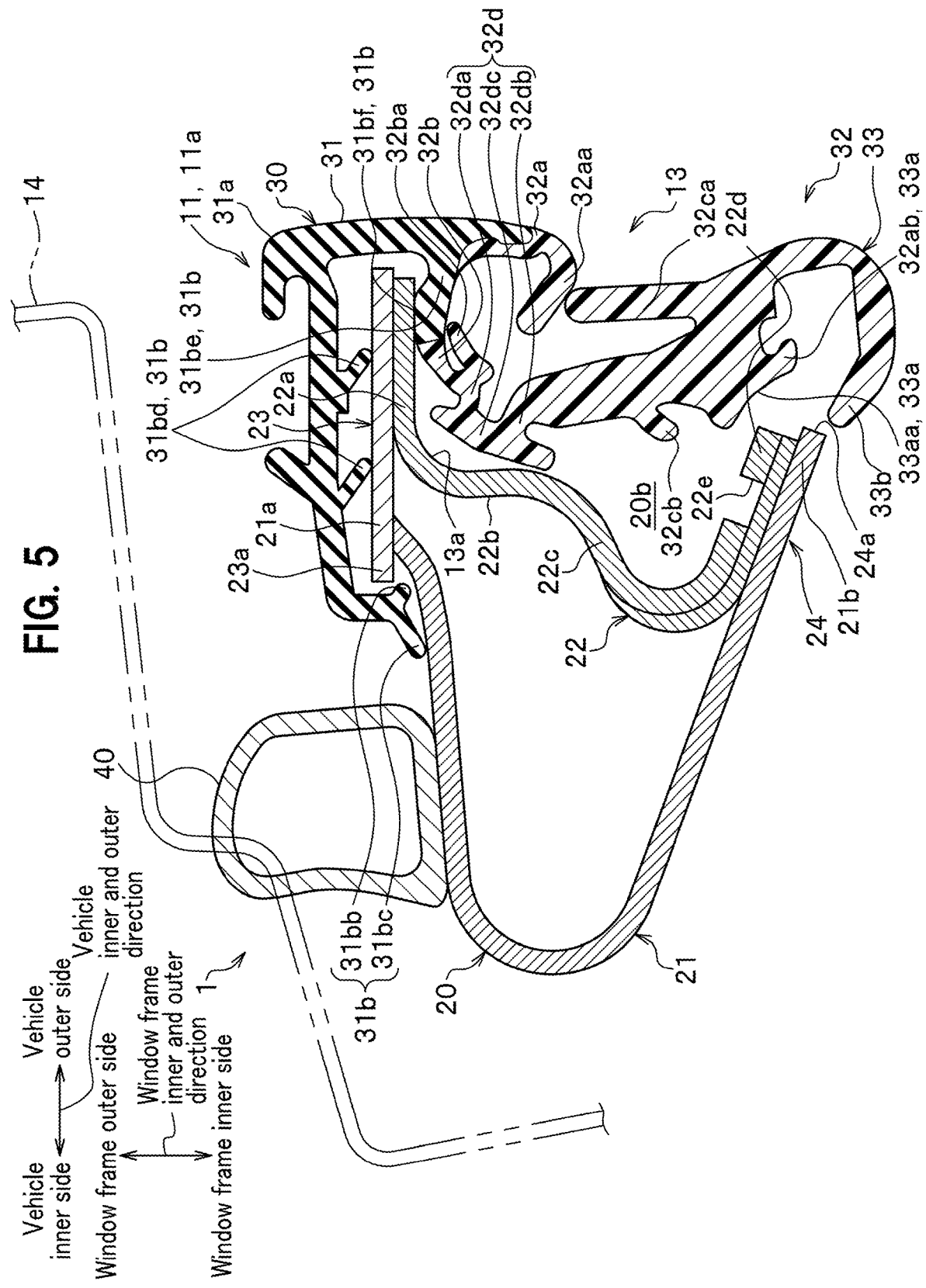
FIG. 5 is a cross-sectional view showing a state of temporary attachment of the molding in the molding assembly to the outer beam portion, which is taken along the II-II line in FIG. 1.

Next, when the molding body 31*a* is further pushed in and the molding locking claw 31*bb* runs on the outer beam engaging projection 23*a* as shown in FIG. 5, the molding elastic beam 31*ba* attempts to restore its original shape by the resilience (the bending reaction force). Accordingly, the molding locking claw 31*bb* is engaged with the outer beam engaging projection 23*a* and the molding 31 is attached to the outer beam portion 23 (in the state of temporary attachment)

Then, in the state of attaching the molding 31 to the outer beam portion 23 (in the state of temporary attachment), the tip ends of the elastic contact springs 31*bd* are bent while coming into contact with the surface on the frame outer side in the frame inner-outer direction of the outer beam portion 23. Then, the molding 31 is biased to the frame outer side in the frame inner-outer direction by the bending reaction force (the resilience) of the elastic contact springs 31*bd*, and the curved supporting portion 31*bf* comes into contact with the surface on the frame inner side in the frame inner-outer direction of the outer beam portion 23.

Meanwhile, in the state of temporary attachment, the tip end portion of the molding 31 is biased to the frame outer side in the frame inner-outer direction by the bending reaction force (the resilience) of the locking claw elastic contact spring 31*bc*, whereby the molding locking claw 31*bb* is engaged with the outer beam engaging projection 23*a*.

Here, in the state of temporary attachment after completion of attachment of the molding 31, the run channel 32 bows and suspends from the bottom portion 32*b* due to its own weight at the upper side portion of the window frame 11, and the guide surface 33*aa* of the guide locking portion 33*a* is opposed to the tip end of the inner beam portion 24.

Next, as shown in FIG. 6, when the run channel 32 is thrust in the same direction as the direction to attach the molding 31 (to the left side in FIG. 6), the tip end of the inner beam portion 24 slides on the guide surface 33*aa*, and the inner wall portion 32*c* moves to the vehicle inner side in the vehicle inner-outer direction and to the frame outer side in the frame inner-outer direction.

When the run channel 32 is thrust further in the same direction, the restorative biasing portion 32*d* of the run channel 32 is elastically deformed as shown in FIG. 7. Accordingly, the locking projection 33*ab* runs on the surface on the frame outer side in the frame inner-outer direction of the inner beam portion 24. At the same time, the locking lip 33*b* runs on the surface on the frame inner side in the frame inner-outer direction of the inner beam portion 24.

When the run channel 32 is thrust even further in the same direction, the guide locking portion 33*a* is housed in the housing recess 20b and the respective constituents of the run channel 32 are housed in the rail portion 13 as shown in FIG. 2.

The assembly work of the run channel 32 is thus completed.

Here, when the thrust of the run channel 32 is terminated (when the input of the attachment force is stopped), the bottom portion 32b is pushed to the vehicle outer side in the vehicle inner-outer direction and to the frame outer side in the frame inner-outer direction by the resilience of the restorative biasing portion 32d to attempt to restore the original shape against the elastic deformation. As a consequence, the molding locking claw 31bb is thrust on and engaged with the outer beam engaging projection 23a, and the bottom portion 32b is thrust on the surface on the frame inner side in the frame inner-outer direction of the outer beam portion 23.

In other words, the molding 31 is pushed to the vehicle outer side by the resilience of the restorative biasing portion 32d, whereby the backlash of the molding 31 in the vehicle inner-outer direction is eliminated. Moreover, the molding 31 is pushed to the frame outer side by the resilience of the elastic contact springs 31bd and of the locking claw elastic contact spring 31bc, whereby the backlash of the molding 31 in the frame inner-outer direction is eliminated.

As described above, as a consequence of eliminating both the backlash in the vehicle inner-outer direction and the backlash in the frame inner-outer direction, the occurrence of noise due to the backlash of the molding 31 is suppressed when the door is opened and closed.

Meanwhile, the inner wall portion 32c of the run channel 32 is thrust on the vehicle inner side in the vehicle inner-outer direction and on the frame inner side in the frame inner-outer direction by the resilience of the restorative biasing portion 32d. Then, the guide locking portion 33a is housed in the housing recess 20b. Moreover, the locking projection 33ab is thrust on the surface on the frame outer side in the frame inner-outer direction of the inner beam portion 24 and is engaged with and held by the engaging portion 22e.

As described above, the run channel 32 is held in the rail portion 13 as a consequence of the engagement of the locking projection 33ab with the engaging portion 22e.

Furthermore, the tip end of the locking lip 33b is thrust on the surface (the rear surface) on the frame inner side of the inner beam portion 24 by the resilience attributed to the flexural deformation, and the locking lip 33b is locked with the rear surface by the friction caused in this event.

As described above, according to the vehicle door sash structure 1 of this embodiment, it is possible to attach the molding 31 and the run channel 32 by the single process of attaching the molding assembly 30 to the window frame body 20 from the vehicle outer side to the vehicle inner side along the vehicle inner-outer direction. In this way, the molding 31 and the run channel 32 can be attached to the window frame 11 with simple work and less man-hours for the work.

Moreover, in the state of temporary attachment after completion of attaching the molding 31 to the outer beam portion 23, the guide locking portion 33a is obliquely opposed to a direction of erection of the outer beam portion 23 while facing the front end rim of the inner beam portion 24. Accordingly, when attaching the run channel 32 to the window frame body 20, the run channel 32 is pushed into the window frame body 20 in the same direction as the direction to attach the molding 31 to the outer beam portion 23. Thus, the holding unit 33 is engaged with the inner beam portion 24 and the run channel 32 is successfully attached to the window frame body 20. In this way, the molding 31 and the run channel 32 can be attached to the window frame 11 with simple work and less man-hours for the work.

The guide locking portion 33a includes the locking projection 33ab provided at the end rim (the outer rim) on the vehicle outer side in the vehicle inner-outer direction. Accordingly, the guide locking portion 33a comes into contact with the tip end of the inner beam portion 24 by performing the action to pushing the run channel 32 into the window frame body 20 in the same direction as the direction to attach the molding 31 to the outer beam portion 23, whereby the run channel 32 is guided to the position of completion of attachment and the locking projection 33ab is engaged with the engaging portion 22e. In this way, it is possible to engage the holding unit 33 with the inner beam portion 24 and to attach the run channel 32 to the window frame body 20 by the single pushing action from the vehicle outer side to the vehicle inner side in the vehicle inner-outer direction.

In the meantime, in the state of completion of attachment, the resilience to attempt to restore the original straight shape is acting on the bent run channel 32. Hence, since the guide locking portion 33a is inclined in the direction to guide the run channel 32 to the position of completion of attachment, the locking projection 33ab is biased in the direction to dig into the engaging portion 22e by the resilience of the run channel 32. As a consequence, the locking projection 33ab is engaged more strongly with the engaging portion 22e and the state of attachment is thus stabilized.

The locking lip 33b is set such a way as to avoid the interference between the tip end rim 24a of the inner beam portion 24 and the guide locking portion 33a while partially overlapping the guide locking portion 33a in the vehicle inner-outer direction. Thus, it is possible to increase the locking force while suppressing the occurrence of an attachment failure (erroneous assembly) of the run channel 32. In this way, it is possible to further stabilize the state of attachment.

In the meantime, in the state of completion of attachment, the locking lip 33b conceals the tip end rim 24a of the inner beam portion 24, a state of engagement between the inner beam portion 24 and the locking projection 33ab, and an aspect of the guide locking portion 33a being housed in the housing recess 20b. Thus, it is possible to improve appearance in the state of completion of attachment and to enhance an exterior view.

By erecting the inner beam portion 24 as with the outer beam portion 23 that is erected on the window frame body 20 from the vehicle inner side to the vehicle outer side along the vehicle inner-outer direction, it is possible to reduce a proportion of reduction in opening area of the door window 10 as a consequence of providing the outer beam portion 23 and the inner beam portion 24.

The end rim of the inner beam portion 24 has the stepped shape in line with the inclination of the guide locking portion 33a. Accordingly, it is possible to guide the run channel 32 to the position of completion of attachment more effectively in combination with the inclination of the guide locking portion 33a.

Meanwhile, the inner beam portion 24 can be set to a welding margin when joining the sash outer portion 22 to the sash inner portion 21. Moreover, the welding brings about a smoother surface by reducing a difference in level between the sash outer portion 22 and the sash inner portion 21, thus improving a guiding performance.

In this embodiment, the resilience of the restorative biasing portion 32d biases and holds the molding 31 at the position of completion of attachment in the state of being engaged with the outer beam portion 23. In this way, it is possible to eliminate the backlash of the molding 31 while retaining the engagement between the molding locking claw 31bb with the outer beam engaging projection 23a.

Moreover, the locking projection 33ab is biased to and held by the engaging portion 22e by the resilience of the restorative biasing portion 32d. In this way, it is possible to eliminate the backlash of the run channel 32 while retaining the engagement between the locking projection 33ab with the engaging portion 22e.

As described above, the relatively simple configuration to use the resilience of the restorative biasing portion 32d makes it possible to further stabilize the state of attachment against the shakes when opening and closing the door, the unexpected vibrations, and the like.

The vehicle door sash structure 1 of this embodiment guides the window glass 12 that goes up and down. However, the present invention is not limited to this configuration. For example, the vehicle door sash structure 1 is also applicable to a structure to support the surroundings of a fixed window glass.

Meanwhile, the vehicle door sash structure 1 of this embodiment constitutes the upper side portion 11a of the window frame 11. However, the application of this embodiment is not limited only to the upper side portion 11a. For example, the vehicle door sash structure 1 is also applicable to the front side portion 11b and the rear side portion 11c of the window frame 11. Moreover, it is also possible to integrate the front side portion 11b, the rear side portion 11c, and the upper side portion 11a together.

Even when the vehicle door sash structure 1 of this embodiment is also applied to the front side portion 11b and the rear side portion 11c of the window frame 11, the direction of attachment to attach each of the front side portion 11b and the rear side portion 11c from the outer side to the inner side in the vehicle inner-outer direction is the same as that applicable to the upper side portion 11a of this embodiment. For this reason, it is possible to further improve the attachment workability by integrating the front side portion 11b, the rear side portion 11c, and the upper side portion 11a together.

In the meantime, this embodiment adopts a locking structure in which the locking projection 33ab is locked onto the plate surface by means of the friction with the inner beam portion 24. However, the locking structure is not limited only to this configuration. For example, as observed in the outer beam engaging projection 23a of the outer beam portion 23, a projection may be formed by cutting and pulling up part of the inner beam portion 24 and so forth, and then the locking projection 33ab of the run channel 32 may be locked with this projection. This configuration also achieves the operation and effects similar to those of this embodiment.

Furthermore, in this embodiment, the window frame body 20 is formed from the two components of the sash inner portion 21 and the sash outer portion 22, and the outer beam portion 23 and the inner beam portion 24 are formed by joining the joining margins 21a, 21b, 22a, and 22d that are set to the respective end rims of the sash inner portion 21 and the sash outer portion 22. However, the present invention is not limited only to this configuration. For example, the window frame body 20 may be formed from one plate member. In this case, the frame body having the same cross-sectional shape as that of this embodiment can be obtained by forming an inner beam portion by bending the plate member and allowing joining margins set on two end rims to overlap each other while forming an outer beam portion by folding back the plate member.

In addition, in this embodiment, the outer beam portion 23 and the inner beam portion 24 are formed such that the interval in the direction toward the end rims between the outer beam portion 23 and the inner beam portion 24 slightly spreads outward in the frame inner-outer direction. However, the present invention is not limited only to this configuration. For example, the outer beam portion 23 and the inner beam portion 24 may be arranged parallel to each other and the interval therebetween may be set constant. This configuration also achieves the operation and effects similar to those of this embodiment.

What is claimed is:

1. A vehicle door sash structure provided with
a window glass arranged in a window frame,
a rail portion constituting the window frame and surrounding a rim of the window glass,
a molding constituting an outer wall of the rail portion,
a window frame body constituting an inner wall of the rail portion, and
a run channel arranged in the rail portion,
the vehicle door sash structure comprising:
　　a molding assembly including the molding and the run channel integrated together and being attached to the window frame body from a vehicle outer side to a vehicle inner side in a vehicle inner-outer direction along a direction from an inner side to an outer side of a vehicle;
　　an outer beam portion taking on a form of a cantilever erected on the window frame body so as to be capable of attaching the molding;
　　an inner beam portion taking on a form of a cantilever erected on the window frame body; and
　　a holding unit provided on the run channel and configured to be lockable with the inner beam portion,
wherein
the holding unit includes a guide locking portion arranged in a region of the run channel opposed in the vehicle inner-outer direction to a tip end rim of the inner beam portion in a state of temporary attachment after completion of attachment of the molding to the outer beam portion,
the guide locking portion is inclined in a direction to guide the run channel to a position of completion of attachment while coming into contact with the tip end rim of the inner beam portion by an input of an attachment force in a direction to attach the molding to the run channel in the state of temporary attachment,
the run channel includes a restorative biasing portion provided between a bottom portion constituting a bottom part of the rail portion and an inner wall portion constituting an inner wall part of the rail portion,
the restorative biasing portion includes
　　a corner part elastic body which is held and biased between the bottom portion and the inner wall portion at the position of completion of attachment;
　　a bottom side bending part which joins the bottom portion to the corner part elastic body; and
　　an inner wall side bending part which joins the inner wall portion to the corner part elastic body, and
the bottom side bending part and the inner wall side bending part are formed thinner than remaining regions of the run channel.

2. The vehicle door sash structure according to claim 1, wherein the guide locking portion includes a locking projection provided at an end rim on the vehicle outer side in the vehicle inner-outer direction and lockable with a plate surface part of the inner beam portion.

3. The vehicle door sash structure according to claim 1, wherein
the window frame body is formed by bending at least one plate member, and
an end rim of the inner beam portion takes on a stepped shape obtained by allowing joining margins set on end rims of the plate member to overlap each other in such a way as to be displaced along the inclination of the guide locking portion.

4. The vehicle door sash structure according to claim 1, wherein
the restorative biasing portion is fitted into the rail portion while being elastically deformed, and
the molding is biased to the outer side in the vehicle inner-outer direction in a state of being fitted to the window frame body by resilience of the restorative biasing portion, and is biased to and held at the position of completion of attachment in a state of being engaged with the outer beam portion.

5. The vehicle door sash structure according to claim 1, wherein the restorative biasing portion is substantially formed to be a Tr shape.

6. The vehicle door sash structure according to claim 1, wherein the molding assembly further includes a molding body and a molding elastic beam which is erected on a vehicle inner side surface of the molding body in the vehicle inner-outer direction toward the vehicle inner side in the vehicle inner-outer direction,
wherein the molding elastic beam includes a molding locking claw and a locking claw elastic contact spring at its tip end, and an elastic contact spring on its frame inner side surface in the frame inner-outer direction, and
wherein the outer beam portion includes an outer beam engaging projection at its vehicle inner side surface in the vehicle inner-outer direction, the outer beam engaging projection being engageable with the molding locking claw.

* * * * *